(12) United States Patent
Healey

(10) Patent No.: US 8,027,584 B2
(45) Date of Patent: Sep. 27, 2011

(54) SENSING A DISTURBANCE

(75) Inventor: Peter Healey, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 543 days.

(21) Appl. No.: 12/280,047

(22) PCT Filed: Feb. 1, 2007

(86) PCT No.: PCT/GB2007/000343
§ 371 (c)(1),
(2), (4) Date: Aug. 20, 2008

(87) PCT Pub. No.: WO2007/096578
PCT Pub. Date: Aug. 30, 2007

(65) Prior Publication Data
US 2009/0252491 A1    Oct. 8, 2009

(30) Foreign Application Priority Data
Feb. 24, 2006    (EP) .................................... 06251013

(51) Int. Cl.
*H04B 10/08* (2006.01)
(52) U.S. Cl. ................ 398/16; 398/13; 398/28; 398/33; 356/73.1; 356/477; 356/450; 385/12; 385/13; 250/227.15; 250/227.17; 250/227.19
(58) Field of Classification Search ............. 398/16, 398/13, 28, 33, 140, 141, 188, 183, 202, 398/208, 209, 214, 212, 17, 20, 25, 26, 27, 398/30, 31, 32, 9; 356/73.1, 477, 450, 483, 356/478, 479; 385/12, 13; 250/227.15, 227.16, 250/227.17, 227.19
See application file for complete search history.

(56) References Cited

U.S. PATENT DOCUMENTS
4,297,887 A    11/1981    Bucaro
(Continued)

FOREIGN PATENT DOCUMENTS
EP    0 251 632 A2    1/1988
(Continued)

OTHER PUBLICATIONS
Application and File History of U.S. Appl. No. 12/280,038, Inventor: Healey, filed Aug. 20, 2008, at www.uspto.gov.
(Continued)

*Primary Examiner* — Hanh Phan
(74) *Attorney, Agent, or Firm* — Patterson Thuente Christensen Pedersen, P.A.

(57) ABSTRACT

The present invention relates to a system for sensing of a disturbance on an optical link. Data traffic from an optical source with a short coherence length is transmitted along the link to a receiver station on one or more of a plurality of time-division-multiplexed channels. One of the channels is used to transmit encoded phase information relating to the phase characteristics of the optical source output. At the receiver station, the actual phase characteristics of the arriving light from the optical source is compared with the encoded phase information. Since a physical disturbance of the link is likely to alter the actual phase characteristics of the arriving light but not the encoded phase information, it is possible to determine if a physical disturbance has occurred. The system can conveniently be used to monitor an optical link carrying communications traffic.

16 Claims, 2 Drawing Sheets

U.S. PATENT DOCUMENTS

| | | | |
|---|---|---|---|
| 4,370,610 A | 1/1983 | Allen |
| 4,397,551 A | 8/1983 | Bage et al. |
| 4,443,700 A | 4/1984 | Macedo et al. |
| 4,463,451 A | 7/1984 | Warmack et al. |
| 4,538,103 A | 8/1985 | Cappon |
| 4,572,949 A | 2/1986 | Bowers et al. |
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A | 2/1989 | Ishii et al. |
| 4,847,596 A | 7/1989 | Jacobson et al. |
| 4,885,462 A | 12/1989 | Dakin |
| 4,885,915 A | 12/1989 | Jakobsson |
| 4,897,543 A | 1/1990 | Kersey |
| 4,907,856 A | 3/1990 | Hickernell |
| 4,976,507 A | 12/1990 | Udd |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,025,423 A | 6/1991 | Earp |
| 5,046,848 A | 9/1991 | Udd |
| 5,051,965 A | 9/1991 | Poorman |
| 5,093,568 A | 3/1992 | Maycock |
| 5,104,391 A | 4/1992 | Ingle et al. |
| 5,140,559 A | 8/1992 | Fisher |
| 5,173,743 A | 12/1992 | Kim |
| 5,187,362 A | 2/1993 | Keeble |
| 5,191,614 A | 3/1993 | LeCong |
| 5,194,847 A | 3/1993 | Taylor et al. |
| 5,206,924 A | 4/1993 | Kersey |
| 5,223,967 A | 6/1993 | Udd |
| 5,307,410 A | 4/1994 | Bennett |
| 5,311,592 A | 5/1994 | Udd et al. |
| 5,313,266 A | 5/1994 | Keolian et al. |
| 5,319,609 A | 6/1994 | Regnault |
| 5,351,318 A | 9/1994 | Howell et al. |
| 5,355,208 A | 10/1994 | Crawford et al. |
| 5,359,412 A | 10/1994 | Schulz |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,384,635 A | 1/1995 | Cohen |
| 5,412,464 A | 5/1995 | Thomas et al. |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert et al. |
| 5,502,782 A | 3/1996 | Smith |
| 5,511,086 A | 4/1996 | Su |
| 5,604,318 A | 2/1997 | Fasshauer |
| 5,636,021 A | 6/1997 | Udd |
| 5,637,865 A | 6/1997 | Bullat et al. |
| 5,663,927 A | 9/1997 | Olson et al. |
| 5,691,957 A | 11/1997 | Spiesberger |
| 5,694,114 A | 12/1997 | Udd |
| 5,754,293 A | 5/1998 | Farhadiroushan |
| 5,767,956 A | 6/1998 | Hawver et al. |
| 5,778,114 A | 7/1998 | Eslambolchi et al. |
| 5,936,719 A | 8/1999 | Johnson |
| 5,975,697 A | 11/1999 | Podoleanu |
| 5,982,791 A | 11/1999 | Sorin |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,148,123 A | 11/2000 | Eslambolchi |
| 6,185,020 B1 | 2/2001 | Horiuchi et al. |
| 6,194,706 B1 | 2/2001 | Ressl |
| 6,195,162 B1 | 2/2001 | Varnham et al. |
| 6,269,198 B1 | 7/2001 | Hodgson et al. |
| 6,269,204 B1 | 7/2001 | Ishikawa |
| 6,285,806 B1 | 9/2001 | Kersey et al. |
| 6,315,463 B1 | 11/2001 | Kropp |
| 6,381,011 B1 | 4/2002 | Nickelsberg |
| 6,459,486 B1 | 10/2002 | Udd et al. |
| 6,487,346 B2 | 11/2002 | Nothofer |
| 6,489,606 B1 | 12/2002 | Kersey et al. |
| 6,594,055 B2 | 7/2003 | Snawerdt |
| 6,625,083 B2 | 9/2003 | Vandenbroucke |
| 6,628,570 B2 | 9/2003 | Ruffa |
| 6,704,420 B1 | 3/2004 | Goedgebuer et al. |
| 6,788,417 B1 | 9/2004 | Zumberge et al. |
| 6,813,403 B2 | 11/2004 | Tennyson |
| 6,859,419 B1 | 2/2005 | Blackmon et al. |
| 6,943,872 B2 | 9/2005 | Endo et al. |
| 7,006,230 B2 | 2/2006 | Dorrer et al. |
| 7,110,677 B2 | 9/2006 | Reingand |
| 7,266,299 B1 | 9/2007 | Bock et al. |
| 7,397,568 B2 | 7/2008 | Bryce |
| 7,536,102 B1 * | 5/2009 | Huffman et al. ............ 398/21 |
| 7,548,319 B2 | 6/2009 | Hartog |
| 7,656,535 B2 | 2/2010 | Healey et al. |
| 7,667,849 B2 | 2/2010 | Sikora et al. |
| 7,697,795 B2 | 4/2010 | Heatley et al. |
| 7,725,026 B2 * | 5/2010 | Patel et al. ............ 398/16 |
| 7,755,971 B2 | 7/2010 | Heatley |
| 7,796,896 B2 | 9/2010 | Sikora et al. |
| 7,817,279 B2 | 10/2010 | Healey |
| 7,848,645 B2 | 12/2010 | Healey et al. |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 | 6/2003 | Bary |
| 2003/0174924 A1 | 9/2003 | Tennyson |
| 2004/0027560 A1 | 2/2004 | Fredin et al. |
| 2004/0113056 A1 | 6/2004 | Everall et al. |
| 2004/0201476 A1 | 10/2004 | Howard |
| 2004/0208523 A1 | 10/2004 | Carrick |
| 2004/0227949 A1 | 11/2004 | Dorrer et al. |
| 2006/0163457 A1 | 7/2006 | Katsifolis et al. |
| 2006/0256344 A1 | 11/2006 | Sikora et al. |
| 2007/0009600 A1 | 1/2007 | Edgren et al. |
| 2007/0065150 A1 | 3/2007 | Sikora et al. |
| 2007/0127933 A1 | 6/2007 | Hoshida et al. |
| 2007/0264012 A1 | 11/2007 | Healey et al. |
| 2008/0013161 A1 | 1/2008 | Tokura et al. |
| 2008/0018908 A1 | 1/2008 | Healey et al. |
| 2008/0123085 A1 | 5/2008 | Sikora et al. |
| 2008/0166120 A1 | 7/2008 | Heatley et al. |
| 2008/0219093 A1 | 9/2008 | Heatley et al. |
| 2008/0219660 A1 | 9/2008 | Healey et al. |
| 2008/0232242 A1 | 9/2008 | Healey |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0103928 A1 | 4/2009 | Healey et al. |
| 2009/0135428 A1 | 5/2009 | Healey |
| 2009/0274456 A1 | 11/2009 | Healey et al. |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |

| | | | |
|---|---|---|---|
| GB | 2 019 561 A | 10/1979 | |
| GB | 2 113 417 A | 8/1983 | |
| GB | 2 126 820 A | 3/1984 | |
| GB | 2 205 174 A | 11/1988 | |
| GB | 2 219 166 A | 11/1989 | |
| GB | 2 262 803 A | 6/1993 | |
| GB | 2 264 018 A | 8/1993 | |
| GB | 2 401 738 A | 11/2004 | |
| JP | 4115205 | 4/1992 | |
| JP | 2001-194109 | 7/2001 | |
| WO | WO 93/25866 A1 | 12/1993 | |
| WO | WO 97/05713 A1 | 2/1997 | |
| WO | WO 01/67806 A1 | 9/2001 | |
| WO | WO 02/065425 A1 | 8/2002 | |
| WO | WO 03/014674 A2 | 2/2003 | |
| WO | WO 2005/008443 A2 | 1/2005 | |
| WO | WO 2005/095917 | 10/2005 | |

OTHER PUBLICATIONS

Application and File History of U.S. Appl. No. 11/663,954, Inventor: Sikora, filed Mar. 28, 2007, at www.uspto.gov.
Application and File History of U.S. Appl. No. 11/791,927, Inventor: Sikora, filed May 31, 2007, at www.uspto.gov.
Application and File History of U.S. Appl. No. 11/887,382, Inventor: Healey, filed Sep. 28, 2007, at www.uspto.gov.
Application and File History of U.S. Appl. No. 11/918,434 Inventor: Healey, filed Oct. 12, 2007, at www.uspto.gov.
Application and File History of U.S. Appl. No. 10/594,433, Inventor: Healey, filed Sep. 26, 2006, at www.uspto.gov.
Application and File History of U.S. Appl. No. 12/295,784, filed Oct. 2, 2008, Inventor: Healey, filed Aug. 20, 2008, at www.uspto.gov.
Application and File History of U.S. Appl. No. 12/280,051, Inventor: Healey, filed Aug. 20, 2008, at www.uspto.gov.
Application and File History of U.S. Appl. No. 11/663,957, Inventor: Healey, filed Mar. 28, 2007, at www.uspto.gov.
Application and File History of U.S. Appl. No. 11/403,200, Inventor: Sikora, filed Apr. 13, 2006, at www.uspto.gov.
Application and File History of U.S. Appl. No. 10/573,266, Inventor: Sikora, filed Mar. 23, 2006, at www.uspto.gov.
Application and File History of U.S. Appl. No. 11/791,923, Inventor: Healey, filed May 31, 2007, at www.uspto.gov.
Application and File History of U.S. Appl. No. 11/885,275, Inventor: Healey, filed Aug. 29, 2007, at www.uspto.gov.
Application and File History of U.S. Appl. No. 11/885,400, Inventor: Heatley, filed Aug. 30, 2007, at www.uspto.gov.
Application and File History of U.S. Appl. No. 11/916,054, Inventor: Sikora, filed Nov. 30, 2007, at www.uspto.gov.
Japanese Office Action for Japanese Application No. 2007-505635 mailed Aug. 17, 2010.
International Search Report for PCT/GB2007/000343 mailed Apr. 18, 2007.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007; Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report for PCT/GB2005/003680 mailed Dec. 1, 2005.
International Search Report for PCT/GB2005/003594 dated Dec. 16, 2005.
International Search Report mailed Jan. 14, 2005 in International Application No. PCT/GB2004/004169.
International Search Report mailed May 8, 2006 in PCT/GB2006/000750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed May 24, 2006 in PCT/GB2006/001325.
International Search Report mailed May 2, 2007 in PCT/GB2007/000359.
International Search Report dated May 16, 2006 in PCT/GB2005/004850.
International Search Report dated Mar. 15, 2006, mailed Mar. 24, 2006 in PCT/GB2005/004873.
UK Search Report dated May 24, 2005 in GB506591.7.
UK Search Report dated Dec. 4, 2003 in GB Application No. GB 0322859.0.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.
State Intellectual Property Office of China, Rejection Decision, Application No. 200580009905.4, dated Dec. 4, 2009, 19 pages.
State Intellectual Property Office of China, Third Notification of Office Action, Application No. 200580009905.4 dated Jun. 19, 2009, 4 pages.
State Intellectual Property Office of China, Second Notification of Office Action, Application No. 20050009905.4 dated Mar. 27, 2009, 4 pages.
State Intellectual Property Office of China, Text of First Office Action, dated Aug. 15, 2008.
European Search Report, Application No. 05733029.2-1524, dated Apr. 6, 2010, 7 pages.
European Search Report, Application No. 05826466.4-2415, dated Jul. 27, 2010.

* cited by examiner

SENSING A DISTURBANCE

This application is the U.S. national phase of International Application No. PCT/GB2007/000343 filed 1 Feb. 2007 which designated the U.S. and claims priority to European Patent Application No. 06251013.6 filed 24 Feb. 2006, the entire contents of each of which are hereby incorporated by reference.

The present invention relates to the sensing of a disturbance, in particular to the sensing of a disturbance along an optical link.

Several techniques are known for sensing a disturbance along an optical link. In one type of interferometric technique, the disturbance is an environmental disturbance, such as an acoustic wave or other time-varying disturbance which causes a phase change to light signals propagating along the link. However, many of these techniques rely on backscattering or reflection along the optical link. The need for backscattering or reflection can make these techniques unsuitable for use with long haul optical links because long haul links normally have one or more repeater amplifiers, each with an optical isolator which acts as a barrier to backscattered or reflected light.

According to one aspect of the present invention there is provided a method of sensing a disturbance along an optical link including the steps of: (i) transmitting along the link carrier signals to a destination, the carrier signals having a waveform with phase irregularities; (ii) performing a first operation so as to generate check signals derived from the phase irregularities in the carrier signal; (iii) transmitting the check signals to the destination; (iv) at the destination, performing a second operation on received carrier signals so as to generate local check signals derived from the phase irregularities in the received carrier signal, the second operation being related to the first operation; and (v) comparing the local check signals with the received check signals so as to determine the presence of a disturbance along the link.

In the absence of a disturbance, the phase irregularities in the transmitted carrier signal and the received carrier signal will be similar. Therefore, because the first and second operations are related, the transmitted check signal and the local check signal will also be related in the absence of a disturbance. However, since a disturbance is likely to disturb the phase of the transmitted carrier signal, this will affect the result of the comparison between the transmitted and local check signals, thereby allowing the disturbance to be detected.

Because the check signals are derived from the phase irregularities in the carrier signal, and because the check signal is transmitted to the destination of the carrier signals, the presence or absence of a disturbance can be determined at the destination, thereby reducing the need to use backscattered light.

The first and second operations will preferably be substantially the same so as to make it easier to compare the local and transmitted check signals. However, the local and transmitted check signals may still be meaningfully compared even if the first and second operations are not the same, provided that the relationship between the two operations is known.

Preferably, the check signals are transmitted along the optical link in the form of an amplitude modulated signal (which may include some phase variations, for example introduced to compensate for expected dispersion or other distortion), such that information related to the phase irregularities in the carrier signal is contained in the form of amplitude variations in the check signal. The amplitude modulation may for example result in a binary signal, but the amplitude modulation may be a modulation of another information-carrying signal. In a preferred embodiment, the check signals are multiplexed into the carrier signal for transmission over the optical link. As a result, the system can conveniently be used to monitor an optical link carrying communications traffic. Although wavelength division multiplexing may be used, time division multiplexing will preferably be used. Although it is preferred that the information in the check signal is represented by amplitude variations, the information may be represented as frequency variations.

The phase variations may be cyclic or may occur in a repeat or other predetermined pattern. However, the phase variations will preferably be random. If an optical source is used to generate the carrier signal, the phase variations may result from the incoherence of the optical source itself, such that phase irregularities occur on a time scale governed by the coherence time of the optical source. Preferably, an optical source with a phase coherence time similar to the inverse of data modulation bandwidth will be used, although a source with a coherence time longer than this may also be used. For a given source, the longest coherence time possible will normally be that determined by the source line width when the source is unmodulated, in one embodiment, the source line width will be 20 MHz, which is equivalent to a phase coherence time of $5 \times 10^{-8}$ seconds. However, the source coherence time may be as high as $10^{-8}$ seconds.

The check signals will preferably be generated interferometrically, for example by tapping off a portion of the carrier signal and passing the tapped carrier signal through an interferometer. The carrier signal will preferably be tapped before and after transmission through the optical link so as to generate the transmitted and local check signals respectively.

A further aspect of the invention is specified in the appended claims. The present invention will now be described in further details below, by way of example, with reference to the following drawing in which:

Figure 1:
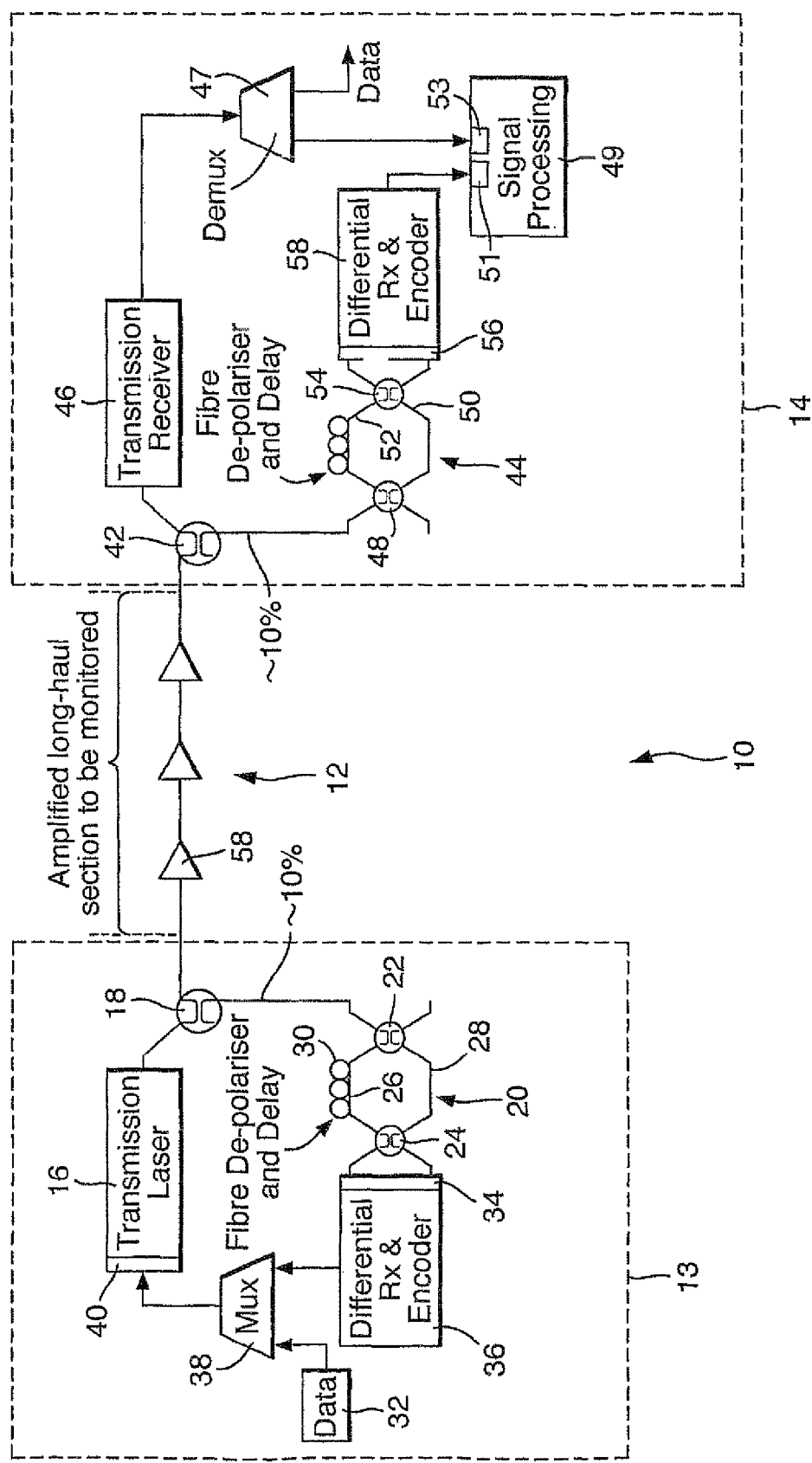
FIG. 1 shows a sensing system according to the present invention.

FIG. 1 shows a sensing system 10 for sensing a disturbance along an optical link 12 extending between a transmitter station 13 and a receiver station 14. Data traffic from an optical source 16 can be transmitted along the link 12 on one or more of a plurality of time-division-multiplexed channels. One of the channels is used to transmit encoded phase information relating to the phase characteristics of the optical source output. At the receiver station 14, the actual phase characteristics of the arriving light from the optical source 16 is compared with the encoded phase information. Since a physical disturbance of the link 12 is likely to alter the actual phase characteristics of the arriving light but not the encoded phase information, it is possible to determine if a physical disturbance has occurred.

In mode detail, the optical source 16 is a Distributed Feedback Laser. At the transmitter station 13, light from the source 16 is coupled to an optical splitter 18. One output of the splitter 18 is connected to the optical link 12, whilst the other output is optically connected to an interferometer, here a Mach Zhender interferometer 20. The splitter is arranged as a tap, such that about 10% of the light from the source 16 is coupled to the interferometer 20, the remaining light being coupled onto the link 12.

The interferometer 20 includes an input coupler 22, an output coupler 24 and, first and second optical paths 26, 28, each of which extends between input and output couplers 22, 24. A delay stage 30 is provided along the first path 26, so as to provide a differential or relative delay for light propagating along the first and second paths. The delay stage will preferably be formed as a Lyot de-polariser, so as to de-polarise the light travelling along the first path. The input coupler 22 serves to split the tapped light from the source 16 such that one portion of the light travels along the first path 26, whilst the other portion travels along the second path, the output coupler 24 serving to interferometrically recombine the light from the first and second paths 26, 28, and thereby provide an interferometric signal. This interferometric signal is detected at a detector 34, for example a PIN photo-diode, which converts the interferometric signal from the optical domain to the electrical domain. An encoder 36 receives the interferometric signal in the electrical domain and encodes the interferometric signal into a binary signal.

A time division multiplexer 38 (or other multiplexer) is provided for multiplexing the encoded interferometric signal with traffic data from a data source 32, so as to provide a multiplexed signal which includes data channels (for carrying data traffic from the source) and a telemetry channel (for carrying the encoded phase information and optionally other information relating to the detection of a disturbance and/or the determination of the position of a disturbance). A driver circuit 40 for driving the optical source 16 receives the multiplex signal from the multiplexer 38 in the electrical domain and causes the optical source to transmit a carrier signal with an amplitude modulation signal thereon, which amplitude modulation is represented of the multiplexed signal.

The portion of this optical signal that is not tapped at the optical splitter 18 is conveyed to the receiver station 14 along the link 12. The receiver station 14 includes a corresponding interferometric arrangement to that provided at the transmitter station 13: at an input to the receiver station 14 there is provided a splitter 42 which serves to tap or channel a small portion (about 10%) of the received light to an interferometer 44, the remainder of the light being channelled to a transmission receiver 46 (such as a PIN photo-diode), where the received optical signal is converted into an electrical signal. The electrical signal from the transmission receiver 46 is passed to a demultiplexer 47, where the signal is demultiplexed into the data channels and the telemetry channel. The telemetry channel is in turn passed to a first input 53 of a signal processing stage 49, which signal processing stage includes a suitably programmed processor and a memory for respectively processing and storing the data, such as data from the telemetry channel. The interferometer 44 at the receiver station 14 is comparable to that at the transmitter station 13, in that the interferometer 44 includes an input coupler 48 for channelling received radiation along a first and second interferometer path 50, 52, and an output coupler 54 for combining light from the first and second paths so as to provide an interferometric signal. In particular, one of the interferometer paths 52 will have a delay stage (which also acts as a de-polariser) that provides a differential delay, which delay will be close to the differential delay provided at the interferometer 20 of the transmitter station 13.

The interferometric signal from the interferometer output coupler 54 is passed to a photo-diode receiver 56, where it is converted to an electrical signal and encoded into binary form at an encoder 58. The encoded interferometric signal is passed to a second input 51 of the signal processing stage 49. The signal processing stage 49 is configured to compare the locally encoded interferometric signal with the interferometric signal encoded at the transmitter station 13, that is, before transmission over the optical link (or portion thereof which is being monitored for disturbances). If the difference between the encoded signals exceeds a threshold level, the signal processor stage 49 is configured to generate a disturbance alert signal. The comparison is carried out using a standard comparison routine executed on a suitably programmed processor, the routing preferably including a filter module for removing background noise.

Thus, by generating interferometric signals derived from the carrier signal before and after transmission, and comparing the two interferometric signals, it is possible to determine the presence of a disturbance.

The operation of the sensing system 10 can be understood from the finite coherence of the optical source. As a result of this finite coherence, the waveform from the optical source will have random phase variations or irregularities occurring on a time-scale corresponding to the phase coherence time of the source. Considering the interferometer 20 at the transmitter station 13, the interferometric signal therefrom will be the result of the interference of two time-displaced irregular waveform portions. Consequently, the interferometric signal will be a signal with an irregular amplitude pattern resulting from the combination (or super position) of the phase variations of the two time-displaced waveform portion. So that the two time-displaced waveform portions are sufficiently displaced, the differential delay of each interferometer is chosen to be larger (preferably by at least a factor of 3 or even 10) than the phase coherence time of the source.

In the absence of any disturbance of the optical link 12, the interferometric signal at the output coupler 54 of the interferometer 44 in the receiver station 14 will be the same as that generated at the transmitter station 13 (except delayed by a time corresponding to the transit time along the optical link 12), since the pattern of phase variations in the waveform from the optical source 16 will be substantially unchanged as the waveform propagates along the link. However, if a time-varying disturbance occurs, this is likely to cause a phase change in the waveform which will be different at different points along the waveform. Consequently, the amplitude pattern of the interferometric signal at the receiver station 14 will be different from that at the transmitter station 13. By comparing these two signals at the signal processing stage 49 of the receiver station 14, the presence of a time-varying disturbance can be detected. Because an interferometer is employed, the present system will be particularly sensitive to even small time-varying disturbances, which impose time-varying phase perturbations on light travelling along the link.

In the present example, the optical link 12 is used to convey the encoded interferometric signal from the transmitter station 13 to the receiver station 14, this being possible since the phase changes due to the disturbance are unlikely to be of sufficient extent to corrupt the encoded interferometric signal. However, the interferometric signal may be conveyed by other means. For example, a radio link could be used instead to carry the interferometric signal, thereby making bandwidth available for further traffic data along the optical link. Alternatively, the encoded interferometric signal could be carried along a different wavelength channel to the traffic data, but over the same optical link.

The input couplers 22, 48 of the interferometers at the transmitter and receiver stations may have a coupling ratio of 50:50 to each interferometer path, but the coupling ratio will preferably be weighed so as to take into account the increased loss in the interferometer path which includes the delay stage.

The choice of delay time at the interferometers 20, 44 will depend on several considerations. Firstly, the delay time should be chosen so as to be greater than the coherence time of the optical source when the source is un-modulated: that is, when the source is operating in continuous wave mode. Where the delay time to be much shorter than the coherence time of the source, the interferometric signal would be substantially constant. It is better to consider the coherence time of the un-modulated source when choosing the delay time because the modulation process may introduce additional phase changes to the waveform of the source (depending on the nature of the modulation). A second consideration when choosing the delay time relates to the frequency components of a disturbance which are to be detected: the sensitivity of the sensing system to frequencies much higher than the inverse of the delay time will be attenuated. Although the above considerations suggest a long delay time, these have to be balanced against the attenuation that a long delay line in the interferometers will bring about. Typically, a delay line of about 10 kilometers to 20 kilometers is thought to provide a good response at acoustic frequencies.

The length of the respective delay time (that is, the extent of the imbalance) at the interferometers at the transmitter and receiver stations 13, 14 should ideally be identical. In practise, however, a match to within the coherence time of the source 16 (when modulated) is thought to be adequate. That is, if the coherence time of the source is given by C then the differential delay D1, D2 of each interferometer should be such that D2−C<D1<D2+C. However, the situation for example where D2−2C<D1<D2+2C is thought to still provide a reasonable response to disturbances.

Figure 2:
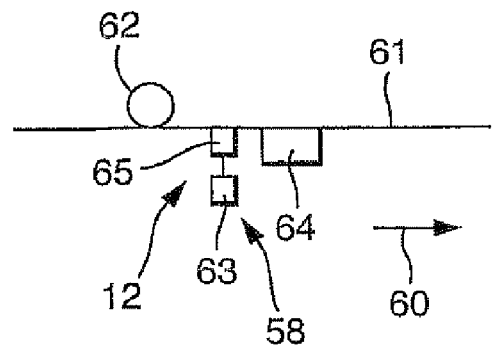
FIG. 2 shows in more detail a portion of an optical link of FIG. 1

The optical link 12 between the transmitter and receiver stations 13, 14 may extend over a distance of several hundred or even thousands of kilometers, in which case the optical link will include one or more repeaters or other optical amplifiers 58 at intervals along the path of the link 12, the amplifiers being connected by optical fibre waveguide portions 61. Such amplifiers are useful in order to compensate for losses along the waveguide portions 61, due for example to Rayleigh backscattering. An example of an amplifier 58 is shown schematically in FIG. 2, where the arrow 60 indicates the travel direction of the carrier signal from the optical source 16 (i.e., from the transmitter station 13 to the receiver station 14). The amplifier includes: an active region, here a portion of Erbium doped fibre 60 for amplifying light travelling there along; an optical pump 63 for pumping the doped fibre with pumping radiation, a WDM coupler 65 for coupling the pumping radiation into the optical fibre waveguide portion 61; and, an optical isolator 64 which allows amplified light (which has passed through the Erbium doped fibre) to progress in the travel direction, but which prevents light travelling in the reverse direction from passing. Such a directional element is useful in reducing the likelihood that a significant amount of backscattered light will enter the active region of amplifier and be amplified therein, possibly making the amplifier unstable. The optical link 12 will preferably be configured to carry light (at least between the amplifiers 58) in a single mode fashion (at a wavelength of 1.3 or 1.55 microns). Preferably, the optical link 12 will carry light over an optical fibre having a core diameter of around 9 or 10 microns. In one embodiment, the optical link 12 will include a sub-sea cable. In such an embodiment, the sub sea cable may be useful in detecting seismic events at the sea bed.

Figure 3:
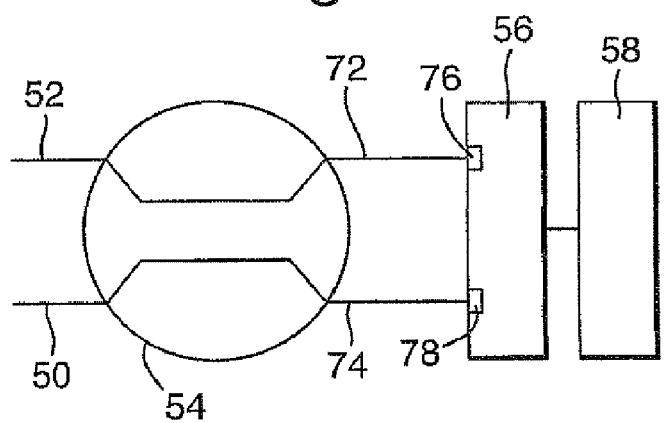
FIG. 3 shows one aspect of a further embodiment of the invention

The detector 56 at the receiver station 14 may detect the interferometric signal from just one of the outputs of the output coupler 54. However, as can be seen more clearly in FIG. 3, the output coupler 54 has a first output 72 and a second output 74. Each of these outputs will provide an interferometric signal, the interferometric signals from each output 72, 74 being complementary to one another. As is shown more clearly in FIG. 3, the detector 56 is a differential detector having a first input 76 and a second input 78, the first and second inputs being arranged to receive the interferometric signal from the first and second outputs respectively of the output coupler 54. Because the receiver is a differential receiver, the output from the receiver (which is passed to the encoder 58 will depend on the difference in the interferometric signal from each output of the output coupler. With such an arrangement, the signal sent to the encoder will be less sensitive to fluctuations in the amplitude of the optical signal arriving at the interferometer 44. This arrangement is likely to be particularly beneficial in situations where amplifiers 58 are needed along the path of the optical link, since such amplifiers normally require a monitoring signal, which monitoring signal normally takes the form of an amplitude modulation of the light travelling along the optical link.

Figure 4:
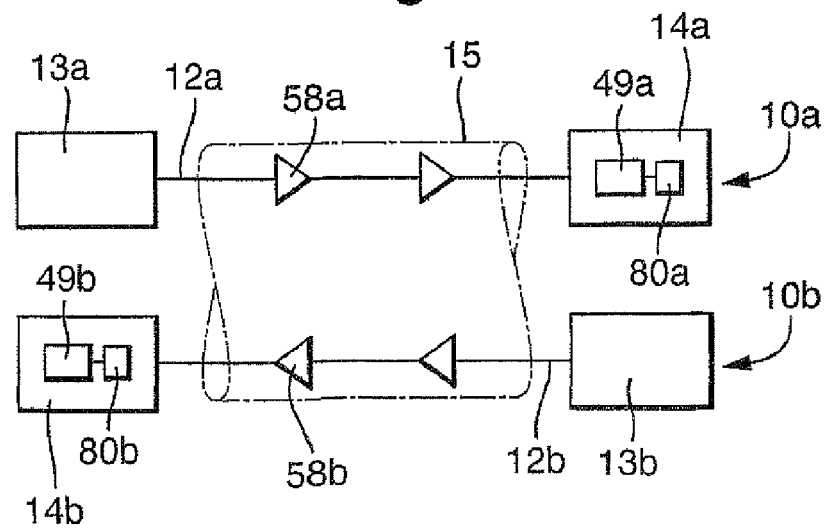
FIG. 4 shows a sensing system suitable for evaluating the position of a disturbance.

FIG. 4 shows a location system suitable for sensing the location of a disturbance. The system is formed from a first sensing system 10a and a second sensing system 10b. Each sensing system 10a,10b is configured to detect a disturbance as described above with reference to FIG. 1, each having a respective transmitter station 13a,13b and a respective receiver station 14a,14b.

A first link 12a extends between the transmitter and receiver stations 13a,14a of the first sensing system 10a, whilst a second link 12b extends between the transmitter and receiver stations 13b,14b of the second sensing system 10b. The first and second links 12a,12b each include a plurality of amplifiers and waveguide portions between the amplifiers in a similar fashion to that of FIG. 2, at least the waveguide portions of the first and second links 12a,12b (and optionally the amplifiers) being held in a common sheath otherwise being secured together, preferably so as to form a cable 15. The two sensing systems are arranged to carry optical radiation in opposite directions to one another, thereby allowing for bidirectional communication. Thus, towards one end of the cable, there is located the transmitter station 13a of the first sensing system and the receiver station 14b of the second sensing system, whilst towards the other end of the cable there is located the transmitter station 13b of the second sensing system and the receiver station 14a of the first sensing system.

Because the first and second links are secured together for example in the same cable, a disturbance to the cable 15 is likely to disturb both of the links 12a,12b. Therefore, the disturbance will be detected at the receiving stations 14a,14b of both the first and second sensing systems 10a,10b. The times at which the disturbance is detected at the two ends of the cable 15 will depend on the position of the disturbance due to the finite transit time of optical signals along the links 12a,12b, a disturbance near one end of the cable being detected at that end before it is detected at the other end. Thus, by monitoring the cable at two positions and noting the local time at which a disturbance is detected at each position, it is possible to infer the location of the disturbance occurring between the two monitoring position along the cable path.

Accordingly, a first and second clock 80a,80b is provided at the respective receiver station 14a,14b of the first and second sensing system 10a,10b. The clocks 80a,80b, each of which is for example a crystal quartz clock, are synchronised to one another in a known fashion, for example using a radio link. Considering the receiver station 14a of the first sensing system 10a, the clock 80a is coupled to the signal processing stage 49a thereof, the signal processing stage being configured to note the clock reading at which at disturbance is detected (other components of the receiver station common to those shown in FIG. 1 have been omitted for clarity). The receiver station of the second sensing station 14b is similarly configured so as to record the time registered at the local clock 80b thereof when a disturbance is detected. Furthermore, the signal processing stage 49b of the second sensing station 14b is configured to transmit the recorded time to the signal processing stage 49a of the first sensing system. From the record of the time of detection of the disturbance at the first and second receiving stages, together with information relating to the transit time for signals travelling along the cable, the signal processing stage 49a of the first sensing system is configured to calculate the position of the disturbance.

Because the first and second links are secured together for example in the same cable, a disturbance to the cable 15 is likely to disturb both of the links 12a,12b. Therefore, the disturbance will be detected at the receiving stations 14a,14b of both the first and second sensing systems 10a,10b.

The system described above can conveniently be used with existing installed communications systems, since the binary inteferometric signal can be transmitted using one of the channels provided by an already installed multiplexer used to multiplex the traffic data. The system is particularly suitable for use with existing communications systems having a long haul subsea link, since the required modifications the to communications (e.g., tapping off some of the radiation) can be carried out towards the ends of the link, where it can easily be accessed. However, although the system in the above embodiment is capable of carrying traffic data whilst the link tarrying the traffic data is being monitored, the system need not be used for communications, and may instead be dedicated to sensing: in such a situation, the signal from the source would be simply formed by the binary signal from the encoder 36.

Furthermore, because an additional optical link for carrying the interferometric signal is not needed, the invention can be implemented in existing communications at little extra cost. A yet further cost-saving feature of the invention is that in an existing system, the incoherence properties of the existing source used for generating the communication traffic signals can be used to generate the interferometric signals (check signals), thereby reducing the need for a dedicated source to be installed, (although with this approach, the long coherence time of the existing source normally brought about by the need for a narrow line width will require the delay time of the interferometers to be longer than would be required with a dedicated broadband source).

The following additional comments are provided.

The method of the invention reduces the need for a dedicated fibre or wavelength by exploiting the existing transmission system source, however, it does require a telemetry channel that could be multiplexed onto the data transmission link. In order to locate the position of the disturbance, two sensors are used, one to monitor each direction of transmission (which should pass through the same cable).

A small fraction of the modulated output light from a laser transmitter is coupled into a long-unbalanced interferometer that is arranged to measure the lower-frequency part of the modulated source coherence properties. One arm of the interferometer has a vibration and acoustically isolated delay fibre with a length that is much greater than the coherence length of the un-modulated source. This, or the other arm, would also contain an all-fibre Lyot de-polariser suitable for de-polarising light from the un-modulated source. The lower-frequency measurement region might extend up to say 10 MHz, but would be well below the modulation data bandwidth—which is likely to extend to several Ghz. The measurement might represent the low-frequency part of the source coherency spectrum or simply the low-frequency part of the real-time 'noise-like' time-domain signal at the interferometer output.

(It is helpful to measure the modulated source coherence properties since the modulation process might introduce significant phase deviations. It is assumed that a narrow spectrum source suitable for long-haul high bit-rate transmission is used. The un-modulated optical bandwidth of such a source is likely to be ~20 MHz or less.) In order to remove low-frequency, intensity modulated, supervisory signals and any other low-frequency intensity variations in the received signal it may be necessary to employ a differential receiver arrangement. The resulting signal is encoded (possibly with as little as 1 bit per sample) and then stored locally or transmitted to the far end of the transmission link by being multiplexed with the data in the standard way.

At the far end of the link, an almost identical unbalanced interferometer and electronic arrangement is used to measure the spectrum or 'noise' signal of a small fraction of the received light. (The un-balance in the second Mach-Zehender should be matched to that in the first to preferably within the coherence length of the modulated source.) The two real-time signals are compared (via the telemetry link), any significant differences being due to phase disturbances introduced at some point along the amplified link. These differences could be analysed using standard methods in order to characterise the nature of the disturbance. The position of the disturbance could be determined by noting the time the disturbance occurs for interferometers measuring each direction of transmission. A disturbance half way along the route will be see at the same time at each end, whereas one closer to one end will be seen at the receiver closest to that end first.

How it Works: the large in-balance in the first interferometer allows us to continuously compare the modulated source field at two epochs separated by the propagation delay of the un-balance. We do the same at the far end of the transmission system. Now, if the phase of the modulated field is modified during transmission by a dynamic disturbance, (i.e., one that is changing in a time scale that is small compared to the differential delay due to the un-balance) then the phase of the two samples will be affected differently. This will result in the two interferometers producing different output waveforms. Thus, by comparing the interferometer outputs from each end of the transmission link it will be possible to detect the time and nature of a disturbance. For example, if we ensure that both signals are of similar magnitude, then by subtracting one from the other we would get zero if there is no disturbance. In practice, the difference is unlikely to be zero due to background pick up in the delay fibres, but signal processing could be used to filter out the desired signals. By doing similar measurements on the return transmission link it will also be possible to locate the disturbance to an accuracy determined by the measurement bandwidth.

The embodiment described above provided a simple way in which existing undersea or other cables can be used to provide a sensor that is distributed, in that the senor is sensitive in a continuous fashion (or semi-continuous fashion if the amplifiers themselves are not sensitive) over a sensing region, which sensing region can be 1 km or more even several hundred km in extent.

The invention claimed is:

1. A method of detecting a disturbance along an optical link including the steps of: (i) transmitting along the link carrier signals to a destination, the carrier signals having a waveform with phase irregularities; (ii) performing a first operation so as to generate check signals derived from the phase irregularities in the carrier signal; (iii) transmitting the check signals to the destination; (iv) at the destination, performing a second operation on received carrier signals so as to generate local check signals derived from the phase irregularities in the received carrier signal, the second operation being related to the first operation; and (v) comparing the local check signals with the received check signals so as to determine the presence of a disturbance along the link.

2. A method as claimed in claim 1, wherein the check signals are transmitted along the optical link.

3. A method as claimed in claim 2, wherein the check signals are amplitude modulated signals.

4. A method as claimed in claim 1, wherein the carrier signals are formed as a multiplexed signal, which multiplexed includes the check signals.

5. A method as claimed in claim 1, wherein the carrier signal is generated by an optical source having a phase coherence time associated therewith, the phase irregularities in the waveform from the optical source occurring on a time scale governed by the coherence time of the optical source.

6. A method as claimed in claim 5, wherein the coherence time of the source is 10 pica second or less, preferably 1 pico second or less.

7. A method as claimed in claim 1, wherein at least one of the transmitted check signals and the local check signals are generated interferometrically.

8. A method as claimed in claim 1, wherein at least one of the transmitted check signals and the local check signals are generated by passing at least part of the carrier signal through an interferometer having a first path and a second path, the first and second paths having a differential delay relative to one another.

9. A method as claimed in claim 8, wherein the transmitted check signals are generated by passing at least part of the carrier signal through a first interferometer located towards a transmission end of the optical link, and wherein the local check signals are generated by passing at least part of the carrier signal through a second interferometer located towards a receiving end of the optical link.

10. A method as claimed in claim 9, wherein the first and second interferometers each have a respective differential delay, time associated therewith, the difference in the respective delay time of the first and second interferometers being less or equal to coherence time of the source.

11. A method as claimed in claim 1, wherein the optical link includes a plurality optical amplifiers connected by optical waveguides.

12. A method as claimed in claim 1, wherein the first and second operations are substantially the same operations.

13. A method as claimed in claim 1, wherein the sensing system is used to communicate traffic data in addition to data used for sensing a disturbance.

14. A method as claimed in claim 13, wherein the check signals are multiplexed with the traffic data source for transmission over the optical link.

15. A method as claimed in claim 1, wherein the link is a bidirectional link, and the method includes the steps of evaluating the position of a disturbance by (i) monitoring the link at a first location and an second location; (ii) recording the time at which a disturbance is detected at each of the first and second locations (iii) and, using the recorded times to evaluate the position of the disturbance.

16. A system for detecting a disturbance, the system including a transmission station for transmitting optical signals along an optical link, and a receiver station for receiving optical signals transmitted along the link, wherein the transmission station has: an optical source for transmitting carrier signals along the link, which carrier signals have a waveform with phase irregularities; and, means for performing a first operation so as to generate check signals derived from the phase irregularities in the carrier signal, and wherein the receiver station has: means for performing a second operation on received carrier signals so as to generate local check signals derived from the phase irregularities in the received carrier signal, the second operation being related to the first operation; and, means for comparing the local check signals with the received check signals so as to determine the presence of a disturbance along the link.

\* \* \* \* \*

UNITED STATES PATENT AND TRADEMARK OFFICE
CERTIFICATE OF CORRECTION

| | | |
|---|---|---|
| PATENT NO. | : 8,027,584 B2 | Page 1 of 1 |
| APPLICATION NO. | : 12/280047 | |
| DATED | : September 27, 2011 | |
| INVENTOR(S) | : Healey | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this
Eleventh Day of March, 2014

Michelle K. Lee
*Deputy Director of the United States Patent and Trademark Office*